(12) United States Patent
Takahashi et al.

(10) Patent No.: US 12,173,752 B2
(45) Date of Patent: Dec. 24, 2024

(54) RESIN COMPOSITION FOR SLIDING MEMBER, AND SLIDING MEMBER

(71) Applicant: OILES CORPORATION, Tokyo (JP)

(72) Inventors: Kohei Takahashi, Fujisawa (JP); Mayaka Suemitsu, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 18/248,301

(22) PCT Filed: Sep. 13, 2021

(86) PCT No.: PCT/JP2021/033608
§ 371 (c)(1),
(2) Date: Apr. 7, 2023

(87) PCT Pub. No.: WO2022/113480
PCT Pub. Date: Jun. 2, 2022

(65) Prior Publication Data
US 2023/0375041 A1    Nov. 23, 2023

(30) Foreign Application Priority Data

Nov. 24, 2020  (JP) ................................ 2020-194719

(51) Int. Cl.
*F16C 33/20* (2006.01)
(52) U.S. Cl.
CPC .................. *F16C 33/201* (2013.01)
(58) Field of Classification Search
CPC ...... F16C 33/201; F16C 33/208; F16C 17/00; F16C 2208/66; F16C 2208/78; F16C 2220/04; F16C 2240/06; F16C 2240/08; F16C 2240/26; F16C 2300/02; C08L 59/00; C08L 91/06
See application file for complete search history.

(56) References Cited

U.S. PATENT DOCUMENTS

| | | | |
|---|---|---|---|
| 5,854,324 A | * | 12/1998 | Tajima ................ C08L 71/02 525/154 |
| 2016/0237221 A1 | | 8/2016 | Monma et al. |
| 2019/0256699 A1 | | 8/2019 | Saito et al. |

FOREIGN PATENT DOCUMENTS

| | | |
|---|---|---|
| JP | 46-41456 | 12/1971 |
| JP | 46-42217 | 12/1971 |
| JP | 63-65232 | 12/1988 |
| JP | H0662831 | * 8/1994 |
| JP | 2002-105279 | 4/2002 |
| JP | 2004-231829 | 8/2004 |
| JP | 2015-34221 | 2/2015 |
| JP | 2015-40301 | 3/2015 |
| JP | 2015-101599 | 6/2015 |
| JP | 2018-104590 | 7/2018 |
| JP | 2020-26485 | 2/2020 |

OTHER PUBLICATIONS

International Search Report dated Nov. 16, 2021, for PCT/JP2021/033608, 4 pp.
Written Opinion of the International Searching Authority dated Nov. 16, 2021, for PCT/JP2021/033608, 3 pp.

* cited by examiner

*Primary Examiner* — Cephia D Toomer
(74) *Attorney, Agent, or Firm* — Nixon & Vanderhye P.C.

(57) ABSTRACT

Provided are a resin composition for a sliding member and a sliding member, which have excellent molding workability and mechanical workability and with which it is possible to improve sliding properties including lubricating properties and wear resistance. The resin composition for a sliding member of the present invention contains, in addition to a polyacetal resin, 2% to 20% by mass of an ultra-high-molecular-weight polyethylene resin, 0.01% to 3% by mass of a modified polyolefin resin, and 0.5% to 3% by mass of a lubricant as additives.

5 Claims, No Drawings

RESIN COMPOSITION FOR SLIDING MEMBER, AND SLIDING MEMBER

CROSS-REFERENCE TO RELATED APPLICATIONS

This application is the U.S. national phase of International Application No. PCT/JP2021/033608 filed Sep. 13, 2021 which designated the U.S. and claims priority to JP Patent Application No. 2020-194719 filed Nov. 24, 2020, the entire contents of each of which are hereby incorporated by reference.

TECHNICAL FIELD

The present invention relates to a resin composition for a sliding member and a sliding member.

BACKGROUND ART

A polyacetal resin has excellent mechanical properties, and also has excellent sliding properties such as friction and wear, heat resistance, chemical resistance, and electrical properties. Therefore, the polyacetal resin has been widely used as engineering plastics for automotive parts, electronic and electric parts, general industrial machinery parts, and the like.

However, a sliding member composed of the polyacetal resin alone has excellent self-lubricating properties and wear resistance, but has a slightly higher coefficient of friction. Moreover, there is a drawback that stick-slip occurs due to fluctuations in the coefficient of friction during sliding, and unpleasant sliding frictional noise (squeak noise) occurs due to the stick-slip.

In order to improve the sliding properties, there have been proposed sliding members or resin compositions for the sliding member, which are obtained by blending the polyacetal resin with a lubricant such as lubricating oil and wax, or with a synthetic resin having low friction properties, such as a polyethylene resin. For example, Patent Literature 1 proposes a method of manufacturing a sliding member containing a lubricant such as lubricating oil and wax in a polyacetal resin. In this method, a thermoplastic synthetic resin composed of a polyacetal resin or a polyamide resin is powdered, mixed with a lubricant, and stirred to uniformly adhere the lubricant to a surface of the resin powder. Next, the mixture is melt-kneaded by a granulator, in which a molding raw material supply part of a heating cylinder is kept at a temperature below a melting point of the synthetic resin by a cooling unit, and the other part of the cylinder is kept at least at a temperature above the melting point of the synthetic resin, to form granules which are used as a molding raw material and molded into a desired shape, thereby manufacturing a sliding member such as a bearing.

In addition, Patent Literature 2 proposes a synthetic resin composition in which a polyacetal resin is blended with a synthetic resin having low friction properties, such as a polyethylene resin. The synthetic resin composition is a crystalline thermoplastic resin composition having improved wear resistance, which contains, as an independent phase, a powdery high-density polyethylene resin in a crystalline thermoplastic resin obtained by melt-mixing the crystalline thermoplastic resin selected from a polyacetal resin, a polyamide resin, and a polyethylene terephthalate resin and the powdery high-density polyethylene resin. Patent Literature 3 proposes a thermoplastic resin composition obtained by melt-kneading 70% to 98% by weight of a thermoplastic resin selected from a polyamide resin, a polyacetal resin, a polyester resin, and a polycarbonate resin and 30% to 2% by weight of ultra-high-molecular-weight polyethylene resin powder. Patent Literature 4 proposes a low-friction, low-wear polyacetal resin composition containing 20% to 45% by weight of a high-density polyethylene resin and 55% to 80% by weight of a polyacetal resin.

CITATION LIST

Patent Literatures

Patent Literature 1: Japanese Patent Publication No. S46-42217
Patent Literature 2: Japanese Patent Publication No. S46-41456
Patent Literature 3: Japanese Patent Publication No. S63-65232
Patent Literature 4: Japanese Patent Application Laid-Open No. 2002-105279

SUMMARY OF INVENTION

Technical Problem

However, with regard to the sliding member obtained by the manufacturing method disclosed in Patent Literature 1, the sliding properties such as friction and wear are significantly improved, but there are problems related to moldability, such as that the lubricating oil having poor compatibility with the polyacetal resin exudes during molding, thereby lengthening a molding cycle, and that the lubricant such as wax bleeds out after the molding, thereby causing a surface of a molded product to be cloudy.

With regard to sliding members composed of the resin compositions disclosed in Patent Literature 2 to Patent Literature 4, the sliding properties such as friction and wear can be improved to some extent. However, compared to sliding members containing a lubricant, the coefficient of friction tends to be higher, and the stick-slip occurs depending on sliding conditions. Therefore, in order to obtain sufficient sliding properties, it is necessary to increase the addition amount, but there arises a problem that a surface of a molded product deteriorates accordingly.

The present invention has been made in view of the above-described points, and an object of the present invention is to provide a resin composition for a sliding member and a sliding member, which have excellent molding workability and with which it is possible to improve sliding properties including lubricating properties and wear resistance.

Solution to Problem

A resin composition for a sliding member according to an aspect of the present invention includes 75% to 97% by mass of a polyacetal resin, and as additives, 2% to 20% by mass of an ultra-high-molecular-weight polyethylene resin, 0.01% to 3% by mass of a copolymer of ethylene and $\alpha,\beta$-unsaturated carboxylic acid, and 0.5% to 3% by mass of a lubricant.

A sliding member according to an aspect of the present invention is composed of the above-described resin composition for a sliding member.

Effect of the Invention

According to the present invention, it is possible to provide a resin composition for a sliding member and a sliding member, which have excellent molding workability and with which it is possible to improve sliding properties including lubricating properties and wear resistance without deteriorating mechanical strength.

DESCRIPTION OF EMBODIMENTS

The details of the present invention will be described below.

The resin composition for a sliding member according to the aspect of the present invention includes 75% to 97% by mass of a polyacetal resin, and as additives, 2% to 20% by mass of an ultra-high-molecular-weight polyethylene resin, 0.01% to 3% by mass of a copolymer of ethylene and α,β-unsaturated carboxylic acid, and 0.5% to 3% by mass of a lubricant. The "% by mass" indicating a blending proportion of the polyacetal resin and the like is a value in a case where the entire resin composition for a sliding member including the additives added as necessary, which will be described later, is taken as 100% by mass.

The polyacetal resin constitutes a base material of the resin composition for a sliding member according to the embodiment of the present invention as a main component, is a polymer compound having an oxymethylene group (—CH$_2$O—) as a main constituent unit, and includes a polyacetal homopolymer consisting of an oxymethylene unit alone and a polyacetal copolymer containing an oxymethylene unit and a comonomer unit. In the present invention, as the polyacetal resin, it is possible to use any of the polyacetal homopolymer and the polyacetal copolymer, but from the viewpoint of thermal stability, it is preferable to use the polyacetal copolymer.

With respect to the polyacetal resin, a melt flow rate (MFR) can be measured in accordance with ASTM-D-1238 method, and a polyacetal resin in which an MFR measured under conditions of a temperature of 190° C. and a measurement load of 2160 g is in a range of 0.1 to 100 g/10 min is preferable, and a polyacetal resin in which the MFR is in a range of 1.0 to 10.0 g/10 min is particularly preferable. Specific examples of the polyacetal resin include, as the polyacetal homopolymer, "Delrin (trade name)" manufactured by DuPont and "TENAC (trade name)" manufactured by Asahi Kasei Corp., and as the polyacetal copolymer, "DURACON (trade name)" manufactured by Polyplastics Co., Ltd.

As the ultra-high-molecular-weight polyethylene resin blended in the resin composition for a sliding member according to the embodiment of the present invention, it is possible to use a polyethylene resin having an intrinsic viscosity [η] of 10 dl/g or more, measured in a decalin acid solvent at 135° C., and having a viscosity-average molecular weight of 500,000 to 6,000,000. Examples thereof include "HI-ZEX MILLION (trade name)" manufactured by Mitsui Chemicals, Inc., "MIPELON (trade name)" manufactured by Mitsui Chemicals, Inc., and "SUNFINE (trade name)" manufactured by Asahi Kasei Corporation. In addition, as the ultra-high-molecular-weight polyethylene resin, it is possible to use a resin including an ultra-high-molecular-weight polyethylene resin having an intrinsic viscosity at 135° C. of 10 to 40 dl/g and a low-molecular-weight or high-molecular-weight polyethylene resin having the intrinsic viscosity of 0.1 to 5 dl/g. Examples thereof include "LUBMER (trade name)" manufactured by Mitsui Chemicals, Inc. Furthermore, it is also possible to use an acid-modified ultra-high-molecular-weight polyethylene resin, and examples thereof include "Modified LUBMER (trade name)" manufactured by Mitsui Chemicals, Inc., which is modified by maleic acid anhydride.

The ultra-high-molecular-weight polyethylene resin has an effect of improving the sliding properties in a case of being blended in the resin composition for a sliding member. By using the acid-modified ultra-high-molecular-weight polyethylene resin, compatibility with the polyacetal resin as a main component is improved, which contributes to the further improvement of the sliding properties. In addition, the ultra-high-molecular-weight polyethylene resin has a role as a retainer for the lubricant described later. A blending amount of the ultra-high-molecular-weight polyethylene resin is 2% to 20% by mass, preferably 2.5% to 5% by mass. In a case where the blending amount of the ultra-high-molecular-weight polyethylene resin is less than 2% by mass, the above-described effect of improving the sliding properties is poor, and in a case of being more than 20% by mass, a dispersion proportion to the polyacetal resin increases, and there is a risk of deteriorating wear resistance or moldability.

With regard to the copolymer of ethylene and α,β-unsaturated carboxylic acid, blended in the resin composition for a sliding member according to the embodiment of the present invention, the α,β-carboxylic acid is at least one selected from acrylic acid and methacrylic acid. By blending the copolymer of ethylene and α,β-unsaturated carboxylic acid in the resin composition for a sliding member, due to reactivity of a carboxyl group included in the structure, the compatibility of ultra-high-molecular-weight polyethylene with the polyacetal resin as a main component increases, and dispersibility of the ultra-high-molecular-weight polyethylene resin in the polyacetal resin is improved. In addition, the copolymer also has a role as a retainer for the lubricant described later. As a result, the moldability of the resin composition for a sliding member can be improved, and the sliding properties can be improved without deteriorating the mechanical strength of the sliding member as a molded product. Furthermore, adhesion of the polyacetal resin to a sliding mating material is suppressed, whereby occurrence of stick-slip is suppressed and occurrence of sliding frictional noise (squeak noise) caused by the stick-slip is suppressed. Specific examples of the copolymer of ethylene and α,β-unsaturated carboxylic acid include "NUCREL (trade name)" manufactured by DOW-MITSUI POLYCHEMICALS Co., Ltd., which is an ethylene/methacrylic acid copolymer, and "Escor (trade name)" manufactured by Exxon Mobil Corporation, which is an ethylene/acrylic acid copolymer.

A blending amount of the copolymer of ethylene and α,β-unsaturated carboxylic acid is 0.01% to 3% by mass, preferably 0.3% to 1% by mass. In a case where the blending amount of the copolymer of ethylene and α,β-unsaturated carboxylic acid is less than 0.01% by mass, the above-described effect of improving the sliding properties is poor, and in a case of being more than 3% by mass, there is a risk of deteriorating the sliding properties.

The lubricant blended in the resin composition for a sliding member according to the embodiment of the present invention imparts lubricating properties to the sliding member obtained by molding the resin composition for a sliding member, and contributes to the improvement of the sliding properties. Examples of the lubricant include waxy substances including natural wax, hydrocarbon-based wax, aliphatic ketone, higher fatty acid, and wax derived from higher fatty acid.

Examples of the natural wax include animal waxes such as beeswax, whale wax, wool wax, and shellac wax; vegetable waxes such as candelilla wax, carnauba wax, jojoba wax, Japan wax, rice bran wax, and castor hardened oil; mineral waxes such as montan wax and ozokerite; and petroleum waxes such as paraffin wax and microcrystalline wax.

Examples of the hydrocarbon-based wax include polyethylene wax, oxidized polyethylene wax, polypropylene wax, oxidized polypropylene wax, polyolefin wax, alkylbenzene, and petrolatum.

Examples of the aliphatic ketone include distearyl ketone, dipalmityl ketone, and dilauryl ketone. Examples thereof include "KAO WAX T1 (trade name)" manufactured by Kao Corporation, as the distearyl ketone.

Examples of the higher fatty acid include a higher saturated fatty acid including lauric acid, myristic acid, palmitic acid, stearic acid, arachidic acid, behenic acid, cerotic acid, and montanic acid, generally having a carbon number of 12 or more; and an unsaturated fatty acid including oleic acid, linoleic acid, linolenic acid, elaidic acid, octadecenoic acid, arachidonic acid, gadoleic acid, erucic acid, and parinaric acid, generally having a carbon number of 18 or more.

Examples of the wax derived from higher fatty acid include higher fatty acid ester, higher fatty acid amide, and higher fatty acid salt.

The higher fatty acid ester is an ester of the above-described higher fatty acid with a monohydric or polyhydric alcohol. Examples of the monohydric alcohol include capryl alcohol, lauryl alcohol, myristyl alcohol, palmityl alcohol, stearyl alcohol, and behenyl alcohol. Examples of the polyhydric alcohol include ethylene glycol, propylene glycol, butanediol, glycerin, pentaerythritol, and sorbitol. Specific examples of the higher fatty acid ester include stearyl stearate, pentaerythritol tetrastearate, stearic acid monoglyceride, behenic acid monoglyceride, and montanic acid wax.

Examples of the higher fatty acid amide include a saturated higher fatty acid amide including lauric acid amide, palmitic acid amide, stearic acid amide, and behenic acid amide; an unsaturated higher fatty acid amide including erucic acid amide, oleic acid amide, brassidic acid amide, and elaidic acid amide; and a higher fatty acid bisamide including methylene-bis-stearic acid amide, ethylene-bis-stearic acid amide, and ethylene-bis-oleic acid amide (including a saturated or unsaturated higher fatty acid alkyl amide such as a higher fatty acid methyl amide and a higher fatty acid ethyl amide).

The higher fatty acid salt (metallic soap) is a salt of the above-described higher fatty acid with an alkali metal such as lithium, sodium, and potassium, an alkaline earth metal such as magnesium, calcium, and barium, or zinc. Specific examples thereof include lithium stearate, calcium stearate, magnesium stearate, and zinc stearate.

In the present invention, one or two or more kinds selected from these lubricants are used. Higher fatty acid ester or higher fatty acid amide is preferable, and among higher fatty acid esters, an ester of higher fatty acid with a polyhydric alcohol is particularly preferable. Specific examples of the higher fatty acid ester include, as the stearic acid monoglyceride which is an ester of stearic acid with glycerin, "ANSTEX (trade name)" manufactured by TOHO Chemical Industry Co., Ltd. and "RIKEMAL (trade name)" manufactured by RIKEN VITAMIN Co., Ltd.; as the behenic acid monoglyceride which is an ester of behenic acid with glycerin, "RIKEMAL (trade name)" manufactured by RIKEN VITAMIN Co., Ltd.; and as an ester of sorbitol with stearic acid, oleic acid, or the like, "RHEODOL (trade name)" manufactured by Kao Corporation. Specific examples of the higher fatty acid amide include, as the lauric acid amide, palmitic acid amide, and stearic acid amide which are saturated higher fatty acid amides, "DIAMID (trade name)" manufactured by Mitsubishi Chemical Corporation and "Neutron (trade name)" manufactured by Nippon Fine Chemical CO., LTD.; as the oleic acid amide and erucic acid amide which are unsaturated higher fatty acid amides, "DIAMID (trade name)" manufactured by Mitsubishi Chemical Corporation, "ARMOSLIP (trade name)" manufactured by Lion Specialty Chemicals Co., Ltd., and "Neutron (trade name)" manufactured by Nippon Fine Chemical CO., LTD.

By blending the higher fatty acid ester as the lubricant in the resin composition for a sliding member according to the embodiment of the present invention, the higher fatty acid ester has a role of imparting lubricating properties by moderately exuding onto a sliding surface in a case where the sliding member obtained by molding the resin composition for a sliding member slides on a mating material. Furthermore, by using the higher fatty acid amide in combination, the sliding performance is further improved. In particular, an effect of lowering coefficient of friction at an initial stage of sliding is exhibited.

A blending amount of the lubricant is 0.5% to 3% by mass. In a case where the blending amount is less than 0.5% by mass, sufficient sliding properties cannot be obtained, and in a case of being blended more than 3% by mass, there is a risk of causing poor appearance of the molded product.

The resin composition for a sliding member according to the embodiment of the present invention is essentially composed of the above-described composition. Furthermore, in the present invention, within a range which does not significantly impair the effects of the invention, the resin composition for a sliding member according to the embodiment of the present invention can include an additional component, and examples of the additional component include lubricating oil, an antioxidant, a mold release agent, an antistatic agent, a surfactant, and a colorant such as a pigment. Examples of the lubricating oil include mineral oils such as spindle oil, refrigerator oil, turbine oil, machine oil, and gear oil; synthetic oils such as silicone oil, ester oil, ether oil, polyalkylene glycol oil, poly-α-olefin oil, halocarbon oil, and fluorine oil; and lubricating oils derived from plant and animal, such as castor oil, coconut oil, palm oil, jojoba oil, rice bran oil, safflower oil, corn oil, avocado oil, macadamia nut oil, olive oil, sesame oil, soybean oil, peanut oil, sunflower oil, cottonseed oil, linseed oil, whale oil, squalene, and squalane. Examples of the antioxidant include a phenol-based antioxidant and a phosphite-based antioxidant.

Furthermore, as necessary, known solid lubricants such as molybdenum disulfide, graphite, polytetrafluoroethylene, boron nitride, and melamine cyanurate; fibrous substances such as glass fiber, carbon fiber, aramid fiber, other synthetic resin-derived fibers, plant-derived fibers, wollastonite, calcium sulfate fiber, potassium titanate fiber, and whisker; or inorganic fillers such as glass powder, silica, talc, clay, mica, sericite, kaolin, zeolite, calcium carbonate, barium sulfate, bentonite, montmorillonite, metal powder, spherical carbon material, calcium oxide, magnesium oxide, titanium oxide, and zinc oxide can be added. In addition, within a range which does not significantly impair the effects of the invention, a polymer such as polyolefin may be added as a modifier, and modified polyolefin can also be used as the polyolefin. Examples thereof include, as a glycidyl methacrylate-modified polyethylene, "BONDFASTE (trade name)" manufactured by Sumitomo Chemical Co., Ltd.; as a maleic acid anhydride-modified polyethylene, "TAFMER M (trade name)" manufactured by Mitsui Chemicals, Inc.; and as a maleic acid anhydride-modified hydrogenated styrene-based thermoplastic elastomer, "Tuftec M (trade name)" manufactured by Asahi Kasei Corporation and "MODIPER (trade name)" manufactured by NOF Corporation.

Components other than the above-described essential composition and additional components are not included except for impurities which are unavoidably mixed in raw materials, manufacturing processes, and the like and do not substantially affect the properties of the resin composition for a sliding member.

With regard to the resin composition for a sliding member according to the embodiment of the present invention, the respective components are weighed so that the blending amounts in the composition are within the above-described range, and are mixed with a mixer such as a Henschel mixer, a super mixer, a ball mill, and a tumbler mixer to form a mixture. Next, the mixture is put into a vented single-screw or twin-screw extruder or a non-vented single-screw or twin-screw extruder, and melt-kneaded to form a string-like molded product. Thereafter, the molded product is cut to produce particulate molding material pellets, and the molding material pellets are molded into a desired shape such as a cylindrical bush and plate-like body by a molding unit such as an injection molding machine.

Example

In the following examples, the following materials were used as the polyacetal resin, the ultra-high-molecular-weight polyethylene resin, the copolymer of ethylene and $\alpha,\beta$-unsaturated carboxylic acid, and the lubricant. In order to confirm the effect of addition of the copolymer of ethylene and $\alpha,\beta$-unsaturated carboxylic acid in the present invention, a copolymer of ethylene and carboxylic acid ester shown in the component [E] below was used in comparative examples. All the following materials is indicated by a trade name.

[A] Polyacetal resin
(A-1) "DURACON M90" manufactured by Polyplastics Co., Ltd.
[B] Ultra-high-molecular-weight polyethylene resin
(B-1) "Modified LUBMER LY1040" manufactured by Mitsui Chemicals, Inc.
(B-2) "LUBMER L5000" manufactured by Mitsui Chemicals, Inc.
[C] Copolymer of ethylene and $\alpha,\beta$-unsaturated carboxylic acid
(C-1) Ethylene/methacrylic acid copolymer "NUCREL AN4233C" manufactured by DOW-MITSUI POLYCHEMICALS Co., Ltd.
[D] Lubricant
(D-1) Stearic acid monoglyceride "ANSTEX MG-100" manufactured by TOHO Chemical Industry Co., Ltd.
(D-2) Behenic acid monoglyceride "RIKEMAL B-100" manufactured by RIKEN VITAMIN Co., Ltd.
(D-3) Erucic acid amide "DIAMID L-200" manufactured by Mitsubishi Chemical Corporation
(D-4) Oleic acid amide "ARMOSLIP CP" manufactured by Lion Specialty Chemicals Co., Ltd.
[E] Copolymer of ethylene and carboxylic acid ester
(E-1) Ethylene/methyl methacrylate copolymer "ACRYFT WK307" manufactured by Sumitomo Chemical Co., Ltd.
(E-2) Ethylene/methyl acrylate copolymer "DPDJ-6169" manufactured by NUC
(E-3) Ethylene/vinyl acetate copolymer "Melthene H-6051" manufactured by TOSOH CORPORATION The above-described materials were used as respective components, and each of the respective components was blended according to component composition shown in Tables 1 to 3, and melt-kneaded at 200° C. with a twin-screw extruder to obtain a pellet-like composition. Next, using an injection molding machine, the pellets were molded at a molding temperature of 190° C. and a mold temperature of 80° C. to produce a test piece (a rectangular plate of 30 mm length, 30 mm width, and 3 mm thickness).

The test piece obtained as described above was subjected to the following sliding test to measure coefficient of friction and an amount of wear, and evaluated for moldability. These results are shown in Tables 1 to 3.

(Evaluation)
<Sliding Test>
Motion form: Thrust unidirectional rotation
Contact pressure 20 kg/cm$^2$
Sliding velocity: 10 m/min
Time: 8 hours
Mating material: SUS304 (Ra: 0.1 (μm))
Lubrication condition: non-lubrication
<Sliding Quietness Evaluation Test>
The presence or absence of abnormal noise was evaluated under the following test conditions.
Motion form: Thrust unidirectional rotation
Contact pressure: 100 kg/cm$^2$
Sliding velocity: 1 m/min
Time: 3 minutes
Mating material: SUS304 (Ra: 0.1 (μm))
Lubrication condition: non-lubrication
Evaluation criteria ○: no abnormal noise, x: abnormal noise
<Moldability>
A molded product (sliding member) was molded from the pellets using an injection molding machine, and after 7 days passed, an appearance of the molded product was visually observed and evaluated.
Evaluation criteria ○: good, x: unacceptable

TABLE 1

|  |  | Example | | | | | | | | | |
|---|---|---|---|---|---|---|---|---|---|---|---|
|  |  | 1 | 2 | 3 | 4 | 5 | 6 | 7 | 9 | 9 | 10 |
| Component composition (% by mass) | (A) Polyacetal resin (A-1) | 96.3 | 93.8 | 88.8 | 78.8 | 96.3 | 96.59 | 95.6 | 93.6 | 96.7 | 96.3 |
|  | (B) Ultra-high-molecular-weight polyethylene resin (B-1) | 2.5 | 5 | 10 | 20 |  |  |  | 2.5 |  |  |
|  | (B-2) |  |  |  |  | 2.5 | 2.5 | 2.5 |  | 2.5 | 2.5 |

TABLE 1-continued

|  |  | Example | | | | | | | | | |
|---|---|---|---|---|---|---|---|---|---|---|---|
|  |  | 1 | 2 | 3 | 4 | 5 | 6 | 7 | 9 | 9 | 10 |
|  | (C) Copolymer of ethylene and α,β-unsaturated carboxylic acid (C-1) | 0.3 | 0.3 | 0.3 | 0.3 | 0.3 | 0.01 | 1 | 3 | 0.3 | 0.3 |
|  | (D) Lubricant (D-1) | 0.5 | 0.5 | 0.5 | 0.5 | 0.5 | 0.5 | 0.5 | 0.5 | 0.5 | 0.9 |
|  | (D-2) |  |  |  |  |  |  |  |  |  |  |
|  | (D-3) | 0.4 | 0.4 | 0.4 | 0.4 | 0.4 | 0.4 | 0.4 | 0.4 |  |  |
|  | (D-4) |  |  |  |  |  |  |  |  |  |  |
|  | (E) Copolymer of ethylene and carboxylic acid ester |  |  |  |  |  |  |  |  |  |  |
|  | (E-1) |  |  |  |  |  |  |  |  |  |  |
|  | (E-2) |  |  |  |  |  |  |  |  |  |  |
|  | (E-3) |  |  |  |  |  |  |  |  |  |  |
| Various characteristics | <Sliding properties> Maximum coefficient of friction | 0.30 | 0.27 | 0.27 | 0.26 | 0.31 | 0.31 | 0.33 | 0.30 | 0.32 | 0.32 |
|  | Fluctuations in coefficient of friction | 0.08 | 0.06 | 0.05 | 0.05 | 0.11 | 0.14 | 0.04 | 0.05 | 0.10 | 0.04 |
|  | Amount of wear (μm) | 4 | 4 | 7 | 12 | 7 | 17 | 10 | 9 | 13 | 8 |
|  | <Sliding quietness> Abnormal noise during sliding | ○ | ○ | ○ | ○ | ○ | ○ | ○ | ○ | ○ | ○ |
|  | <Moldability> Appearance of molded article | ○ | ○ | ○ | ○ | ○ | ○ | ○ | ○ | ○ | ○ |

TABLE 2

|  |  | Example | | | | |
|---|---|---|---|---|---|---|
|  |  | 11 | 12 | 13 | 14 | 15 |
| Component composition (% by mass) | (A) Polyacetal resin (A-1) | 94.2 | 96.3 | 96.7 | 94.2 | 96.3 |
|  | (B) Ultra-high-molecular-weight polyethylene resin (B-1) |  |  |  |  |  |
|  | (B-2) | 2.5 | 2.5 | 2.5 | 2.5 | 2.5 |
|  | (C) Copolymer of ethylene and α,β-unsaturated carboxylic acid (C-1) | 0.3 | 0.3 | 0.3 | 0.3 | 0.3 |
|  | (D) Lubricant (D-1) | 3 |  | 0.3 | 0.5 | 0.5 |
|  | (D-2) |  | 0.9 |  |  |  |
|  | (D-3) |  |  | 0.2 | 2.5 |  |
|  | (D-4) |  |  |  |  | 0.4 |
|  | (E) Copolymer of ethylene and carboxylic acid ester |  |  |  |  |  |
|  | (E-1) |  |  |  |  |  |
|  | (E-2) |  |  |  |  |  |
|  | (E-3) |  |  |  |  |  |
| Various characteristics | <Sliding properties> Maximum coefficient of friction | 0.25 | 0.30 | 0.32 | 0.25 | 0.29 |
|  | Fluctuations in coefficient of friction | 0.04 | 0.05 | 0.11 | 0.04 | 0.07 |
|  | Amount of wear (μm) | 15 | 8 | 16 | 15 | 9 |
|  | <Sliding quietness> Abnormal noise during sliding | ○ | ○ | ○ | ○ | ○ |
|  | <Moldability> Appearance of molded article | ○ | ○ | ○ | ○ | ○ |

TABLE 3

| | | Comparative Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Component composition (% by mass) | (A) Polyacetal resin (A-1) | 97.8 | 73.1 | 96.6 | 91.6 | 95.6 | 95.6 | 95.6 | 96.9 | 92.2 | 92.7 | 99.1 |
| | (B) Ultra-high-molecular-weight polyethylene resin (B-1) | 1 | 25 | | | | | | | | | |
| | (B-2) | | | 2.5 | 2.5 | 2.5 | 2.5 | 2.5 | 2.5 | 2.5 | 2.5 | |
| | (C) Copolymer of ethylene and α,β-unsaturated carboxylic acid (C-1) | 0.3 | 1 | | 5 | | | | 0.3 | 0.3 | 0.3 | |
| | (D) Lubricant (D-1) | 0.5 | 0.5 | 0.5 | 0.5 | 0.5 | 0.5 | 0.5 | 0.3 | 5 | 0.5 | 0.9 |
| | (D-2) | | | | | | | | | | | |
| | (D-3) | 0.4 | 0.4 | 0.4 | 0.4 | 0.4 | 0.4 | 0.4 | | | 4 | |
| | (D-4) | | | | | | | | | | | |
| | (E) Copolymer of ethylene and carboxylic acid ester (E-1) | | | | | 1 | | | | | | |
| | (E-2) | | | | | | 1 | | | | | |
| | (E-3) | | | | | | | 1 | | | | |
| Various characteristics | <Sliding properties> Maximum coefficient of friction | 0.33 | 0.23 | 0.35 | 0.33 | 0.32 | 0.32 | 0.33 | 0.33 | 0.22 | 0.25 | 0.33 |
| | Fluctuations in coefficient of friction | 0.14 | 0.07 | 0.08 | 0.17 | 0.07 | 0.16 | 0.14 | 0.06 | 0.06 | 0.04 | 0.15 |
| | Amount of wear (μm) | 71 | 316 | 30 | 49 | 205 | 58 | 71 | 90 | 23 | 25 | 9 |
| | <Sliding quietness> Abnormal noise during sliding | ○ | ○ | ○ | ○ | ○ | ○ | ○ | ○ | ○ | ○ | x |
| | <Moldability> Appearance of molded article | ○ | ○ | ○ | ○ | ○ | ○ | ○ | ○ | x | x | x |

From the above-described test results, in Examples 1 to 15 in which all the components was within the blending amount range of the present invention, it was found that high sliding performance and sliding quietness were exhibited, and there was no problem of poor appearance in the molded product.

In Comparative Example 1 in which the blending amount of the ultra-high-molecular-weight polyethylene resin was smaller than the range of the present invention, the amount of wear was larger compared with Examples. This is because it is insufficient to obtain the low-friction and wear-resistant effects of the ultra-high-molecular-weight polyethylene resin, and the lubricating properties are insufficient due to a decrease in the lubricant retaining function. In Comparative Example 2 in which the blending amount of the ultra-high-molecular-weight polyethylene resin was larger than the range of the present invention, since the blending amount of the polyacetal resin as a base material was reduced, sufficient strength could not be obtained and the wear resistance was significantly deteriorating.

In Comparative Example 3 in which the copolymer of ethylene and α,β-unsaturated carboxylic acid was not blended, the wear resistance was deteriorated. This is because, in a case where the copolymer of ethylene and α,β-unsaturated carboxylic acid is used in combination with the ultra-high-molecular-weight polyethylene resin, the effect as a compatibilizer and the effect as a retainer of the lubricant cannot be sufficiently exhibited. In Comparative Example 4 in which the blending amount of the copolymer of ethylene and α,β-unsaturated carboxylic acid was larger than the range of the present invention, since the copolymer of ethylene and α,β-unsaturated carboxylic acid separates from the polyacetal resin as a base material and peeling easily occurs in the molded product, the coefficient of friction fluctuates and the amount of wear increases, so that the sliding properties are deteriorated.

In addition, in Comparative Examples 5 to 7 in which the ethylene/methyl methacrylate copolymer, ethylene/ethyl acrylate copolymer, or ethylene/vinyl acetate copolymer, which were the copolymers of ethylene and carboxylic acid ester, were blended instead of the copolymer of ethylene and α,β-unsaturated carboxylic acid, the sliding properties, particularly the wear resistance was deteriorated. This is because there is no effect of modifying the polyacetal resin obtained by the reactivity of the carboxyl group as in the copolymer of ethylene and α,β-unsaturated carboxylic acid of the present invention.

In Comparative Example 8 in which the blending amount of the lubricant was smaller than the range of the present invention, the wear resistance was deteriorated compared with Examples. This is because the lubricating effect of the lubricant is insufficient. In Comparative Examples 9 and 10 in which the blending amount of the lubricant was larger than the range of the present invention, the surface of the molded product was cloudy and the appearance of the molded product was deteriorated. In addition, in Comparative Example 11 in which only the lubricant was blended in the polyacetal resin, the sliding quietness was inferior, jetting (phenomenon in which, in a case where a resin with low temperature and high viscosity comes into contact with a surface of a mold, traces of flow remain on a surface of a molded product, resulting in a meandering resin flow pattern) occurred during the molding, and the appearance of the molded product was deteriorated.

Although several embodiments of the invention have been described above, these embodiments are provided by way of example and are not intended to limit the scope of the invention. These novel embodiments can be implemented in various other forms, and various omissions, replacements, and modifications can be made without departing from the gist of the invention. These embodiments and modifications are included in the scope and gist of the invention, and are included in the scope of the invention described in the claims and equivalents thereof.

The invention claimed is:

1. A resin composition for a sliding member consisting of: 75% to 97% by mass of a polyacetal resin; and
as additives, 2% to 20% by mass of an ultra-high-molecular-weight polyethylene resin, 0.01% to 3% by mass of a copolymer of ethylene and α,β-unsaturated carboxylic acid, and 0.5% to 3% by mass of a lubricant.

2. The resin composition for a sliding member according to claim 1,
wherein the α,β-unsaturated carboxylic acid in the copolymer of ethylene and α,β-unsaturated carboxylic acid is at least one selected from acrylic acid and methacrylic acid.

3. The resin composition for a sliding member according to claim 1,
wherein the lubricant is at least one selected from natural wax, hydrocarbon-based wax, higher fatty acid, higher fatty acid ester, higher fatty acid amide, and higher fatty acid salt (metallic soap).

4. The resin composition for a sliding member according to claim 1,
wherein the lubricant is higher fatty acid ester and higher fatty acid amide.

5. A sliding member comprising the resin composition for a sliding member according to claim 1.

* * * * *